United States Patent
Prater

[19]

[11] Patent Number: 6,158,265
[45] Date of Patent: Dec. 12, 2000

[54] METHOD OF FORMING RETAINING MEMBERS ON A HOUSING

[75] Inventor: Ronald E. Prater, Rochester, Mich.

[73] Assignee: Koppy Corporation, Orion, Mich.

[21] Appl. No.: 09/265,142

[22] Filed: Mar. 8, 1999

Related U.S. Application Data

[62] Division of application No. 08/822,578, Mar. 20, 1997, Pat. No. 5,896,970.

[51] Int. Cl.[7] .................................................. B21D 28/10
[52] U.S. Cl. ......................................... 72/326; 29/893.34
[58] Field of Search .................. 72/325, 326; 29/893.34; 192/70.2, 70.19

[56] References Cited

U.S. PATENT DOCUMENTS

| | | | |
|---|---|---|---|
| 2,196,619 | 4/1940 | Andresen | 72/326 |
| 2,774,132 | 12/1956 | Squire | 72/326 |
| 3,599,512 | 8/1971 | Wayman . | |
| 3,780,601 | 12/1973 | Dach et al. . | |
| 3,841,452 | 10/1974 | Newsock et al. | 192/70.2 |
| 3,922,932 | 12/1975 | Maurice et al. . | |
| 4,014,619 | 3/1977 | Good et al. | 403/359 |
| 4,089,097 | 5/1978 | Good et al. | 29/163.5 |
| 4,699,259 | 10/1987 | McColl | 192/70.12 |
| 4,706,789 | 11/1987 | McColl et al. | 192/70.12 |
| 4,716,756 | 1/1988 | Fujioka et al. | 72/412 |
| 4,813,522 | 3/1989 | Fujioka et al. . | |
| 4,945,782 | 8/1990 | Farrell . | |
| 5,069,575 | 12/1991 | Anderson . | |
| 5,078,536 | 1/1992 | Anderson . | |
| 5,180,043 | 1/1993 | Walker . | |
| 5,305,943 | 4/1994 | Walker | 228/176 |
| 5,706,694 | 1/1998 | Bhookmohan | 72/325 |
| 5,761,949 | 6/1998 | Dalessandro | 72/325 |

Primary Examiner—Daniel C. Crane
Attorney, Agent, or Firm—Howard & Howard

[57] ABSTRACT

A clutch housing for use in a transmission is generally cylindrical or cup-shaped and has an open end. Axially-extending inner planar portions and outer planar portions are alternately disposed about the periphery of the clutch housing. Angular planar portions are disposed between the inner and outer planar portions and are continuous with the inner and outer planar portions. A retaining member is formed on each inner planar portion by lancing each inner planar portion and inwardly displacing a portion of the inner planar portion adjacent the lance. Preferably, the lance is arcuate in shape, with the arc centered toward the open end of the clutch housing. The displaced portion is formed into a retaining member, which has for its shape two generally planar, generally triangular sidewalls and a generally regular-trapezoidal wall. The trapezoidal wall has a long parallel edge and a short parallel edge. The long parallel edge is defined by the open end of the clutch housing and the short parallel edge is defined by the lance. The displaced portion of material adjacent the lance defines the abutment surface for contacting a snap ring. Preferably the trapezoidal wall has a flattened portion adjacent the lance which is generally parallel to the inner planar portion. A lance and form tool and method for manufacturing the retaining members are also disclosed.

13 Claims, 2 Drawing Sheets

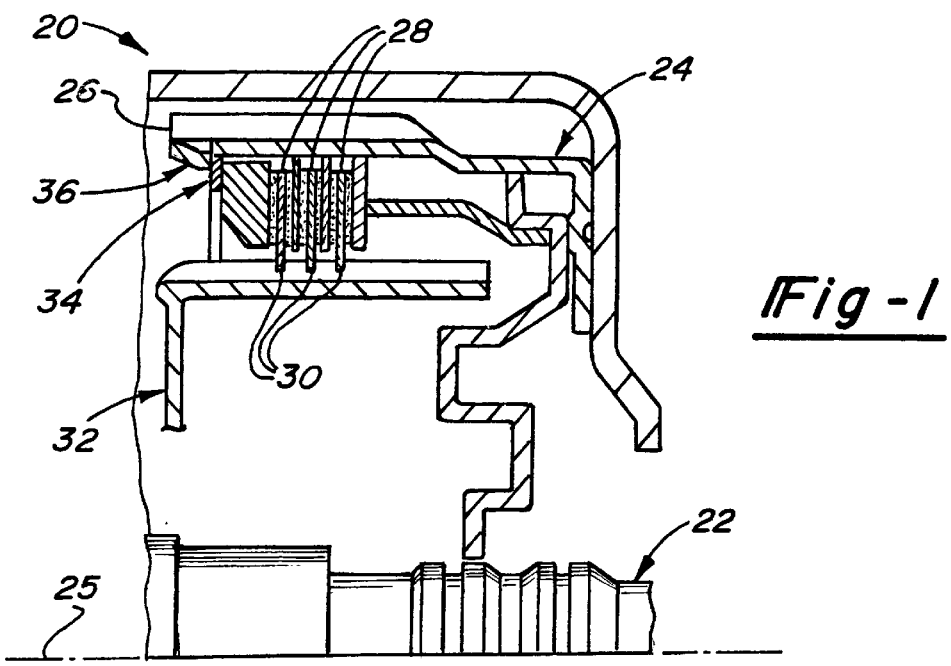
*Fig-1*
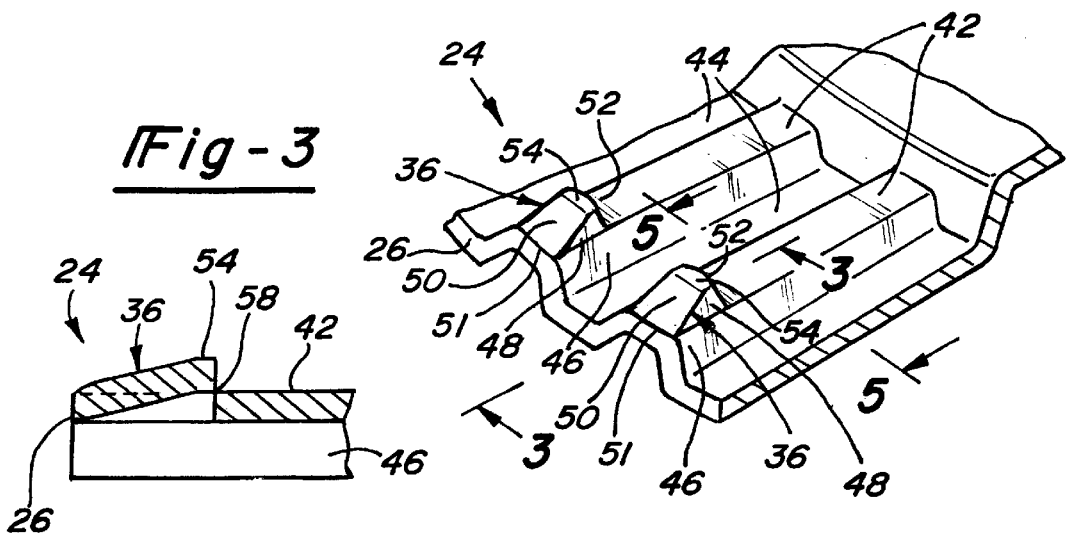
*Fig-3*
*Fig-2*
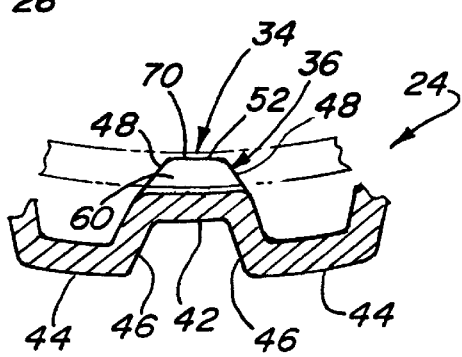
*Fig-5*
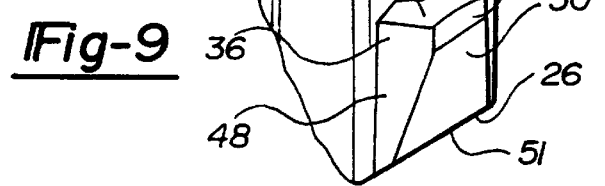
*Fig-9*

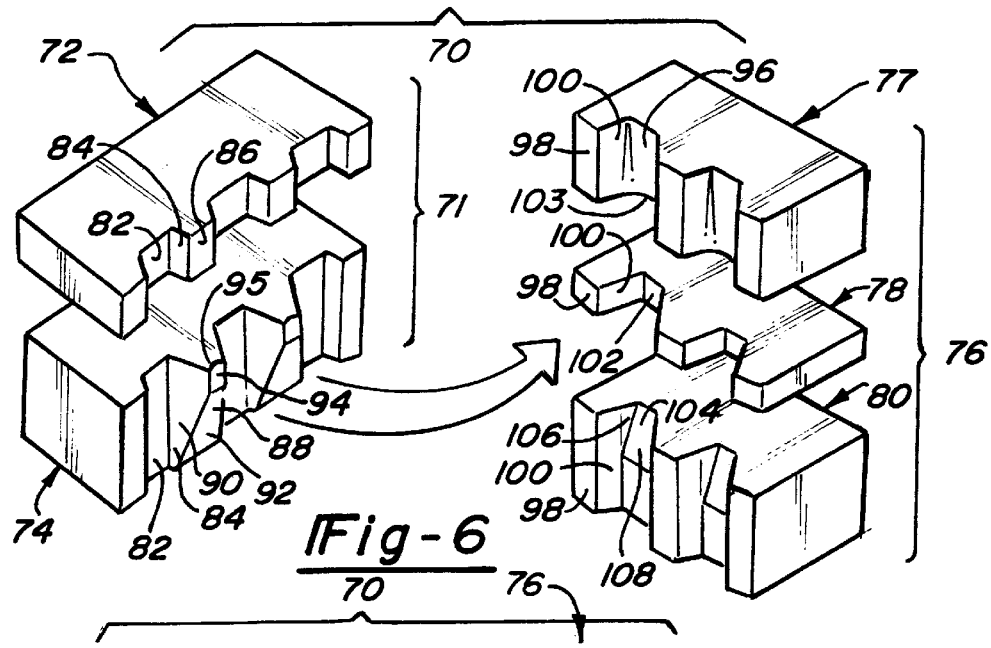
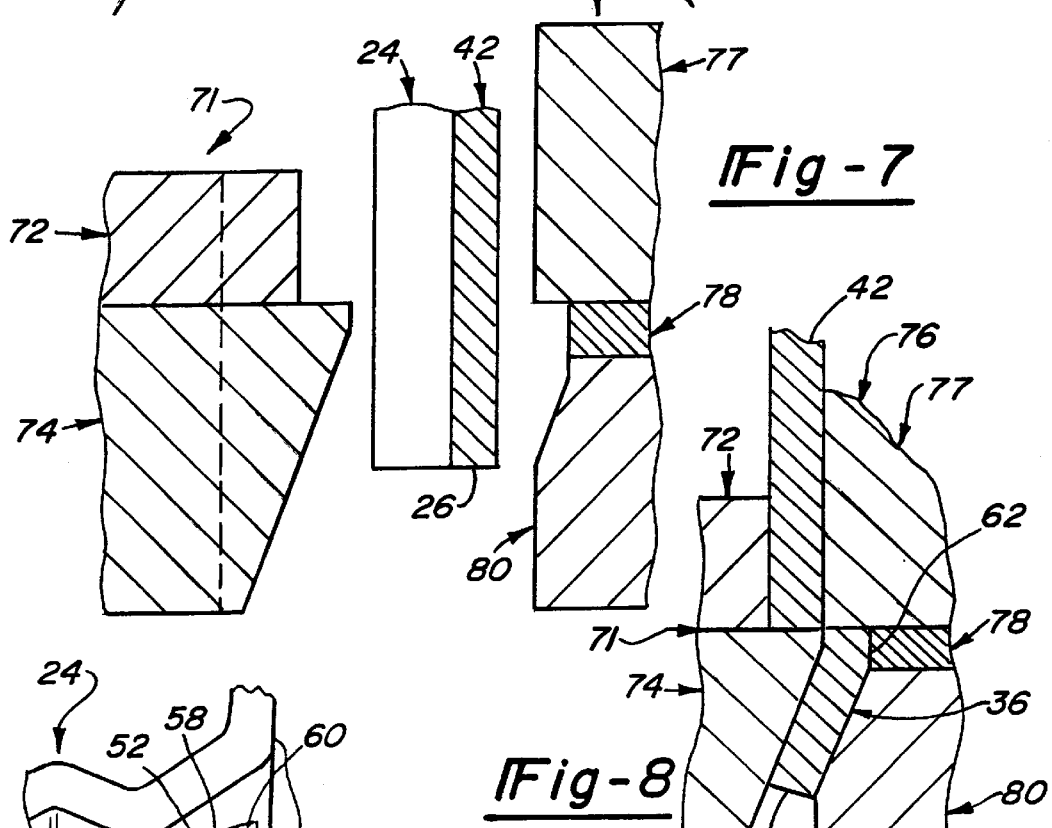
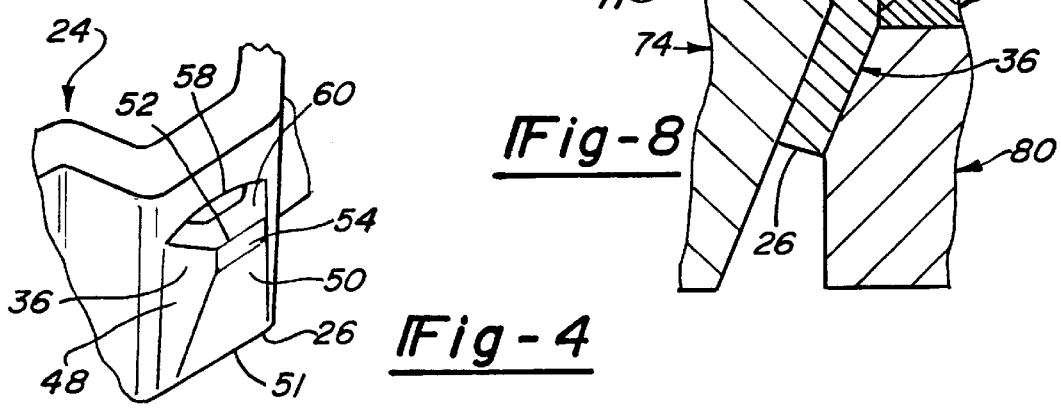

METHOD OF FORMING RETAINING MEMBERS ON A HOUSING

This application is a divisional of application Ser. No. 08/822,578, which was filed on Mar. 20, 1997, now U.S. Pat. No. 5,896,970.

BACKGROUND OF THE INVENTION

The present invention relates to clutch housings for use in transmissions and more particularly to a device for the retention of a snap ring within a clutch housing.

Clutch housings used in transmissions are generally cylindrical or cup-shaped and have an axis and an open end. A plurality of axially-extending inner planar portions and outer planar portions are alternately disposed about the periphery of the clutch housing to form splines. Angular planar portions are disposed about the periphery of the clutch housing between the inner and outer planar portions and are continuous with the inner and outer planar portions.

In operation, the clutch housing contains a plurality of annular driven clutch plates. Complementary teeth on the outer periphery of the driven clutch plates engage the interior splines of the clutch housing. Interposed between the driven clutch plates are a plurality of annular driving clutch plates having teeth on their inner periphery in engagement with the outer periphery of an interior hub, which is another splined clutch housing. When an axial engaging force is applied to the clutch plates, friction between the driving and driven clutch plates transmits torque from the internal hub to the clutch housing. The torque capacity of the clutch is proportional to the number of pairs of surfaces in contact; i.e., increasing the number of clutch plates in the clutch housing proportionally increases the torque capacity of the clutch.

The axial engaging force is imparted axially toward the open end of the clutch housing. In order to retain the clutch plates within the clutch housing, a snap ring is secured within the inner-periphery of the clutch housing between the clutch plates and the open end of the clutch housing. Various devices and methods have been used to secure the snap ring within the clutch housing. However, the axial engaging forces acting upon the clutch plates and snap ring are high, especially in heavy duty applications. This has required the placement of the snap ring at an increased distance from the open end of the clutch housing, in an effort to provide sufficient strength from that portion of the spline between the snap ring and the open end. Nevertheless, known clutch housings experience failure when the axial engaging forces cause the splines to be "peeled back" from the snap ring to the open end of the clutch housing. In particularly heavy duty applications such as in heavy equipment where the clutch housings are subjected to high stress, the clutch housings have required the use of an external reinforcement band welded about the outer periphery of the open end of the clutch housing in order to prevent failure. However, the external band interferes with the engagement of the external splines with other components and can interfere with the assembly of the clutch housing into the transmission. The external band also increases the cost of manufacturing the clutch housing and the total weight of the clutch housing.

One known clutch housing for use in a transmission retains the snap ring within a snap ring groove formed in the inner planar portions of the clutch housing. The snap ring groove is formed by machining slots, generally the thickness of the snap ring, across each of the inner planar portions around the inner circumference of the clutch housing. However, this method of machining the slots in the inner planar portions is expensive, and the removal of material from the splines weakens the clutch housing, causing failure of the clutch housing as described above or requiring the use of the aforementioned external reinforcement band.

Another known method for forming a snap ring groove is disclosed in U.S. Pat. No. 4,014,619, the assignee of which is the assignee of the present invention. In that method two parallel lances are formed across each inner planar portion. The material between the lances is then displaced radially outwardly to form the snap ring groove. However, the spline is weakened by the cuts which extend across each spline. In order to prevent the failure of the clutch housing, it is necessary to increase the distance of the snap ring groove from the open end of the clutch housing and/or to provide an external reinforcement band around the outer circumference of the open end of the clutch housing.

In another known method for forming a snap ring groove, disclosed in U.S. Pat. No. 4,997,073, a single cut is made entirely across each inner planar portion. Below the cut, a section of the inner planar portion is deformed radially outwardly of the clutch housing. The section above the cut (toward the open end of the clutch housing) is not deformed, thereby exposing an edge. The radially outwardly deformed sections of the inner planar portions form a snap ring groove on the inner circumference of the clutch housing. The forces on the snap ring bear on the edge of the non-deformed section. The cut across the entire inner planar portion weakens the spline and the clutch housing, requiring the placement of the snap ring at an increased distance from the end of the drum and/or the use of an external reinforcement band to prevent failure.

In another known method for retaining snap rings, disclosed in U.S. Pat. No. 3,922,932, an orifice is formed substantially across each of the outer planar portions. Material of the outer planar portion is displaced radially inwardly of the drum. The inwardly displaced material is used to retain the snap ring. The clutch housing formed by this method is weakened by the removal of material adjacent the snap ring. It is therefore necessary to retain the snap ring at a substantial distance from the open end of the clutch housing and/or use an outer reinforcement band around the open end of the clutch housing to prevent "peeling back" of the spline. Further, the removal of material adjacent the deformed portion is expensive.

SUMMARY OF ThE INVENTION

The present invention provides a clutch housing having retaining members for retaining a snap ring which are stronger and less expensive to manufacture than known devices for retaining a snap ring. The present invention further provides a clutch housing that allows the snap ring to be retained at a minimum distance from the open end of the clutch housing without requiring the use of an outer reinforcement band. The present clutch housing can therefore accommodate more clutch plates than a previously known clutch housing of identical axial length. Increasing the number of clutch plates within a clutch housing proportionally increases the torque capacity of a clutch. The present clutch housing can therefore be used in currently-designed transmissions to increase the torque capacity of the clutch and transmission. Alternatively, the present clutch housing could be used in new transmission designs in which the axial length of the clutch housing and transmission could be reduced while maintaining the same number of clutch plates. Reducing the axial length of the clutch housing and transmission in this way would reduce the weight of the transmission, without any loss of torque capacity. In addition, the external periphery of the splines in the clutch housing can engage other components without interference from an outer reinforcement band.

According to the present invention, there is provided a generally cylindrical clutch housing having a plurality of inner planar portions and outer planar portions alternately disposed about the periphery of the clutch housing to form splines. Angular planar portions are disposed about the periphery of the clutch housing between the inner and outer planar portions and continuous with the inner and outer planar portions. In order to retain a snap ring within the clutch housing, each of the inner planar portion is provided with a radially inwardly displaced retaining member adjacent the open end of the clutch housing. Although the retaining members will be described herein as being on each and every inner planar portion, it will be understood that "each planar portion" can include a plurality of inner planar portions, or alternate inner planar portions.

A retaining member is formed by making a lance, preferably arcuate, laterally in a portion of the inner planar portion and displacing a portion of material above the lance radially inwardly with a lance and form tool. Preferably, the lance is arcuate, with the arc centered toward the open end of the clutch housing. The lance and form tool also forms the displaced portion into a retaining member having two generally planar, generally triangular sidewalls and a generally regular-trapezoidal wall. The trapezoidal wall has a long parallel edge defined by the open end of the clutch housing and a short parallel edge defined by the lance. The surface of the displaced portion-adjacent the lance forms the abutment surface which contacts the snap ring. The arcuate lance provides the retaining member with an abutment surface which is perpendicular to the inner planar portion. Preferably the trapezoidal wall has a flattened portion which is generally parallel to the inner planar portion near the short parallel edge.

The present clutch housing provides greater strength and is less expensive to manufacture than previously known clutch housings which use other methods for retaining snap rings in clutch housings. The retaining member does not require the expensive removal of material or a cut across the entire inner planar portion, both of which methods weaken the clutch housing as discussed above. In addition, the present retaining member is provided with increased strength by columnar support of the triangular walls to which the force on the snap ring is evenly distributed by the perpendicular abutment surface. The retaining member can therefore be formed at a minimum distance from the open end of the clutch housing, permitting additional clutch plates to be accommodated within the clutch housing.

Because the clutch housing does not require an outer band and does not have material displaced radially outwardly, the outer circumference of the clutch housing is available for engagement with other components without interference. In addition, the lack of an outer band and outwardly displaced material facilitates the assembly of the clutch housing into a transmission.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a cross sectional view of an automatic transmission incorporating a clutch housing of the present invention;

FIG. 2 is a fragmentary perspective view of the clutch housings of FIG. 1;

FIG. 3 is a sectional view of the clutch housing shown in FIG. 2 taken along line 3—3;

FIG. 4 is a fragmentary perspective view of the clutch housing of FIG. 2.

FIG. 5 is a sectional view of the clutch housing shown in FIG. 2 taken along line 5—5;

FIG. 6 is an exploded view of a lance and form tool which can be used to manufacture the clutch housing of FIGS. 1–4;

FIG. 7 is a sectional view of the lance and form tool of FIG. 5 and a clutch housing to be lanced and formed.

FIG. 8 is a sectional view of the lance and form tool of FIG. 5 lancing and forming a clutch housing.

FIG. 9 is an illustration of an alternative embodiment of the clutch housing of FIGS. 2–5.

DESCRIPTION OF THE PREFERRED EMBODIMENT

An automatic transmission 20 is shown in FIG. 1 having a shaft 22 fixed to a clutch housing 24 according to the present invention. The clutch housing 24 is preferably cylindrical or cup shaped, having an axis 25 and an open end 26. The clutch housing 24 contains a plurality of annular driven clutch plates 28. Complementary teeth on the outer periphery of the driven clutch plates 28 engage the interior of the clutch housing 24. Interposed between the driven clutch plates 28 are a plurality of annular driving clutch plates 30 having teeth on their inner periphery in engagement with the outer periphery of an interior hub 32, which is another clutch housing. When an axial engaging force is applied to the clutch plates 28 and 30, friction between the driven and driving clutch plates 28 and 30 transmits torque from the internal hub 32 to the clutch housing 24. The axial engaging force is imparted axially towards the open end 6 of the clutch housing 24. In order to retain the clutch plates 28 and 30 within the clutch housing 24, a snap ring 34 is secured within the inner periphery of the clutch housing 24 near the open end 26. Retaining members 36 disposed adjacent the open end 26 of the clutch housing 24 retain the snap ring 34.

As can be seen in FIG. 2, axially-extending inner planar portions 42 and outer planar portions 44 are alternately disposed about the periphery of the clutch housing 24 to form splines. Angular planar portions 46 are disposed about the periphery of the clutch housing 24 between the inner and outer planar portions 42, 44 and are continuous with the inner and outer planar portions 42, 44. The clutch housing 24 is preferably AISI No. 1010 or 1008 or other suitable material.

Each of the inner planar portions 42 has a radially inwardly displaced retaining member 36 adjacent the open end 26 of the clutch housing 24. The retaining member 36 has two generally planar, generally triangular sidewalls 48 sloping inwardly from the inner planar portion 42 to a generally regular-trapezoidal wall 50. The trapezoidal wall 50 has a long parallel edge 51 defined by the open end 26 of the clutch housing 24 and an opposite short parallel edge 52. The trapezoidal wall 50 preferably has a flattened portion 54 which is generally parallel to the inner planar portion 42.

As shown in FIG. 3, each retaining member 36 is formed by making a lance 58, laterally in the inner planar portion 42.

A portion of material 36 above the lance 58 is displaced radially inwardly and formed into a retaining member 36. The flattened portion 54 of the trapezoidal wall 50 is formed adjacent the lance 58 and the short parallel edge 52 of the trapezoidal wall 50 is defined by the lance 58.

As can be seen in FIG. 4, the lance 58 is preferably arcuate, with the interior of the arc oriented toward the open end 26 of the clutch housing 24. The lance 58 exposes an abutment surface 60 on the retaining member 36 for contacting a snap ring.

Referring to FIG. 5, the snap ring 34 is retained in the clutch housing 24 by the retaining members 36 (one shown), with the axial engaging force pressing the snap ring against the abutment surfaces 60.

It should be apparent the retaining members 36 could also be formed by deforming the material 36 above the lance 58 in the outer player portions 44 radially outwardly in order to retain an outer snap ring as shown in FIG. 9. Further, the retaining members 36 could be formed away from the open end 26 and could be oriented toward or away from the open end 26 of the clutch housing 24.

The retaining members 36 are preferably formed in the clutch housing 24 utilizing the lance and form tool 70 shown in FIG. 6. The lance and form tool 70 includes a outer die 71 comprising a first portion 72 and a second portion 74. An inner die 76 includes an upper portion 77, a central portion 78 and a lower portion 80. It should be understood that the terms "upper" and "lower" are with reference to the drawings only, and that in operation the lance and form tool 70 is not restricted with respect to any particular orientation.

The first portion 72 includes outer planar surfaces 82, angular planar surfaces 84, and inner planar surfaces 86 which are complementary to the outer surface of the clutch housing. The second portion 74 of the outer die 71 includes outer planar surfaces 82, angular planar surfaces 84, and retaining member male dies 88. The retaining member male dies 88 each include triangular surfaces 90 sloping inward and a trapezoidal surface 92. The trapezoidal surface 92 preferably includes a flattened portion 94 which has an arcuate edge 95.

The upper portion 77 of the inner die 76 includes inner planar surfaces 96, outer planar surfaces 98 and angular planar surfaces 100 which are complementary to the inner surface of the clutch housing. Each inner planar surface 96 of the upper portion 77 further includes an arcuate edge 103 complementary to the arcuate edge 95 on the flattened portion 94 on the outer die 71. The central portion 78 of the inner die 76 includes outer planar surfaces 98 and angular planar surfaces 100 and a recessed flattened portion 102. The lower portion 80 of the inner die 76 includes outer planar surfaces 98, angular planar surfaces 100 and retaining member dies 104. Each retaining member die 104 includes triangular surfaces 106 sloping inward to a trapezoidal surface 108.

In operation, the first portion 72 and second portion 74 are stacked as shown in FIG. 7 to form the outer die 71. The upper portion 77, the central portion 78 and the lower portion 80 are likewise stacked to form the inner die 76. The inner die 76 is positioned inside the clutch housing 24 opposite the complementary outer die 71. The outer die 71 is positioned on the outer surface of the clutch housing 24 and is properly aligned with the clutch housing 24 by the planar surfaces 82, 84, 86, which are complementary to the planar surfaces of the clutch housing 24.

As can be seen in FIG. 8, as the outer die 71 is driven toward the inner die 76, the inner planar portion 42 is lanced by the second portion 74 of the outer die 71 and the upper portion 77 of the inner die 76. The inner planar portion 42 is permanently deformed adjacent the lance to form the retaining member 36. The shape of the retaining member 36 is formed by the second portion 74 and the lower portion 80, with the flattened portion 54 being formed by the central portion 78.

This method of forming the retaining members 36 is less expensive than other methods for retaining snap rings because it does not require the removal of material. Rather, two inner planar portions 42 are lanced and formed simultaneously using the lance and form tool 70 of the present invention.

Referring to FIG. 4, the present retaining member 36 provides greater strength than previously known methods for retaining snap rings 34 (not shown) in clutch housings 24. The triangular sidewalls 48 provide columnar support for the snap ring 34 and prevents the retaining member from being "peeled back" by the axial engaging force. The present retaining member 36 is lanced and does not require the expensive and weakening process of removing material from the inner planar portions 42. Further, making a straight lance in the inner planar portions 42 and displacing material radially inwardly results in an contact surface which would form an obtuse angle with the inner planar portion 42 because the displaced material is "pivoting" at the open end 26 of the clutch housing 24. The preferred arcuate shape of the lance 58 provides the retaining member 36 with an abutment surface 60 which is perpendicular to the inner planar portion 42, thereby distributing the axial force on the snap ring evenly to the triangular sidewalls 48 and the trapezoidal wall 50.

The present retaining member 36 is formed adjacent the open end 26 of the clutch housing 24 to permit the present clutch housing 24 to accommodate more clutch plates 28, 30 than previously known clutch housings of equal axial length. Because the present clutch housing 24 does not require an external reinforcement band, the outer circumference of the clutch housing 24 is available for engagement with other components, the manufacturing costs and weight of the clutch housing are decreased, and the clutch housing 24 can be assembled into the transmission 20 with less interference.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of forming retaining members on a housing that is useful for a vehicle driveline having a generally cylindrical body with an axis, a side wall and an opening at one end of the body, comprising the steps of:

lancing the side wall in only one direction that is generally perpendicular to the axis of the housing at a plurality of arcuately spaced locations without removing any material from the sidewall in the vicinity of each lance; and deforming a portion of the sidewall immediately adjacent each lance by moving the portion radially relative to a center of the body such that each deformed portion is a retaining member extending between a first end of the deformed portion and the corresponding lance.

2. The method of claim 1, including deforming the portions of the sidewall in a radially outward direction.

3. The method of claim 1, including deforming the portions of the sidewall in a radially inward direction.

4. The method of claim 1, wherein the side wall includes a plurality of spline portions and the method includes lancing and deforming selected ones of the spline portions.

5. The method of claim 1, including deforming the sidewall portions to form each with two generally triangular sidewalls and a generally trapezoidal wall that has a long parallel edge at the first end and a short parallel edge, the long parallel edge being at the open end of the housing and the short parallel edge being immediately adjacent the corresponding lance.

6. A method of forming a retaining member in a clutch housing having an open end and having inner planar portions and outer planar portions alternately disposed about the periphery of the clutch housing, comprising the steps of:

lancing a selected one of the planar portions;

displacing a portion of the selected planar portion material extending between the lance and the open end of the clutch housing radially to form the retaining member extending from the open end with two triangular sidewalls and a trapezoidal wall that has a long parallel edge at the lance and a short parallel edge near the open end of the housing.

7. The method of claim 6 including lancing the planar portion without removing any material from the planar portion in the vicinity of the lance.

8. The method of claim 6, including radially displacing the portion of material in a radially inward direction.

9. The method of claim 6, including radially displacing the portion of the material in a radially outward direction.

10. The method of claim 6, including:

providing an outer die having outer planar surfaces and angular planar surfaces complementary to the outer circumference of the clutch housing;

providing an inner die having outer planar surfaces, inner planar surfaces and angular planar surfaces complementary to the inner circumference of the clutch housing,;

one of the inner die or the outer die including at least one retaining member male die having triangular surfaces continuous with a trapezoidal surface and the other said die including at least one retaining member female die having triangular surfaces and a trapezoidal surface;

positioning the outer die outside the clutch housing;

aligning the inner and outer planar portions of the outer die with the inner and outer planar portions of the clutch housing;

positioning the inner die within the clutch housing;

aligning the inner die with the outer die; and driving at least one of the inner die or the outer die relative to the other said die to simultaneously lance and permanently deform the selected portion of material.

11. The method of claim 10, including providing two retaining member female dies and two retaining member male dies.

12. The method of claim 10, including providing the male die with triangular surfaces continuous with a trapezoidal surface and providing the female die with triangular surfaces continuous with a trapezoidal surface.

13. The method of claim 12, including using the inner and outer dies to prevent any removal of the material in the vicinity of the lance.

* * * * *